United States Patent
Tsai et al.

(10) Patent No.: US 7,629,731 B2
(45) Date of Patent: Dec. 8, 2009

(54) PLANAR FIELD EMISSION ILLUMINATION MODULE COMPRISING ELECTRON AMPLIFICATION PLATES

(75) Inventors: Woo-Hu Tsai, Taipei (TW); Tzung-Han Yang, Taipei (TW)

(73) Assignee: Tatung Company, Taipei (TW)

( * ) Notice: Subject to any disclaimer, the term of this patent is extended or adjusted under 35 U.S.C. 154(b) by 581 days.

(21) Appl. No.: 11/482,723

(22) Filed: Jul. 10, 2006

(65) Prior Publication Data

US 2007/0108885 A1 May 17, 2007

(30) Foreign Application Priority Data

Nov. 14, 2005 (TW) .............................. 94139896 A

(51) Int. Cl.
*H01J 1/14* (2006.01)

(52) U.S. Cl. .................. 313/346 R; 313/497; 313/310; 313/103 R; 313/495

(58) Field of Classification Search ......... 313/495–497, 313/306, 309–310, 346, 351, 355, 293–304, 313/103 R–107, 533
See application file for complete search history.

(56) References Cited

U.S. PATENT DOCUMENTS

| | | | | |
|---|---|---|---|---|
| 4,806,827 A | * | 2/1989 | Eschard | 313/533 |
| 5,656,887 A | * | 8/1997 | Voshell et al. | 313/496 |
| 5,751,109 A | * | 5/1998 | Payne | 313/542 |
| 6,215,243 B1 | * | 4/2001 | Janning | 313/496 |
| 6,323,594 B1 | * | 11/2001 | Janning | 313/495 |
| 6,943,494 B2 | * | 9/2005 | Chiou et al. | 313/496 |
| 7,002,290 B2 | * | 2/2006 | Russ et al. | 313/497 |
| 7,081,703 B2 | * | 7/2006 | Chen et al. | 313/495 |
| 7,208,866 B2 | * | 4/2007 | Chiou et al. | 313/497 |
| 2003/0113450 A1 | * | 6/2003 | Park et al. | 427/255.28 |
| 2004/0085012 A1 | * | 5/2004 | Chen | 313/495 |
| 2004/0174109 A1 | * | 9/2004 | Chiou et al. | 313/103 R |
| 2005/0099112 A1 | * | 5/2005 | Chiou et al. | 313/496 |
| 2005/0122030 A1 | * | 6/2005 | Sakamoto et al. | 313/496 |
| 2005/0264170 A1 | * | 12/2005 | Oh | 313/497 |

* cited by examiner

*Primary Examiner*—Sikha Roy
*Assistant Examiner*—Jose M Diaz
(74) *Attorney, Agent, or Firm*—Bacon & Thomas, PLLC

(57) ABSTRACT

A planar field emission illumination module includes a top substrate, a bottom substrate, and a plurality of electron-amplification sets located between the top substrate and the bottom substrate. Each electron-amplification set has multiple electron-amplification plates spaced at gaps, which are formed of a metal and coated with an electron-amplification material on the surfaces. The cross section of each electron amplification plate can be V-shaped, U-shaped, semi-circular, arc-shaped, trapezoid, irregular, and the combination thereof. The planar field emission illumination module can focus the electrons and regulate the distribution of the electrons effectively. Hence, the planar field emission illumination module can provide a flat light source with illumination uniformity and high brightness.

22 Claims, 5 Drawing Sheets

PLANAR FIELD EMISSION ILLUMINATION MODULE COMPRISING ELECTRON AMPLIFICATION PLATES

BACKGROUND OF THE INVENTION

1. Field of the Invention

The invention relates to a planar field emission illumination module and, more particularly, to a planar field emission illumination module for liquid crystal displays (LCDs) or planar illuminators.

2. Description of Related Art

In recent years, display devices have become increasingly important daily life. For example, computers, the Internet, televisions, cellphones, personal digital assistants (PDAs), digital still cameras can exchange the messages under the control of a display. As compared to conventional cathode ray tube (CRT) displays, new-generation flat panel displays have the light, small and ergonomic features, but they also have poor brightness and consume too much power.

One of the widely used flat panel displays is an LCD. However, the LCD is not self-illuminating. A display function of the LCD is achieved by adding an external light source. Accordingly, a backlight module can act as a light source for the LCD and becomes an important component of the LCD.

A display backlight source for a flat panel display typically is a Cold Cathode Florescent Lamp (CCFL). Due to a shape limit of the lamp, the backlight module of the display is equipped with a lightguide sheet, a reflector sheet and a diffuser sheet for uniformly dispersing beams emitted by the lamp. In addition, certain space thickness is also required for the uniform dispersion mentioned above. Thus, the uniform lighting beams can be provided to the liquid crystal panel of the flat panel display or LCD.

Moreover, in order to provide a high-brightness illumination effect to the LCD, the operating power of the lamp is increased to meet the requirement of high quality frame, which relatively increases power consumption and heat generation and does not meet the developing requirements for current color flat panel displays that are toward large scale, high precision and high quality.

Therefore, it is desirable to provide an improved illumination module to mitigate and/or obviate the aforementioned problems of high power consumption, large volume, additional components, insufficient brightness and high temperature.

SUMMARY OF THE INVENTION

The present invention provides a planar field emission illumination module, which can provide a flat light source with illumination uniformity and high brightness.

According to a feature of the invention, a planar field emission illumination module is provided. The planar field emission illumination module includes a top substrate, a bottom substrate and a plurality of electron-amplification sets located between the top substrate and the bottom substrate. The top substrate has a fluorescent powder coating and an anode. The bottom substrate has a bottom plate, a plurality of cathodes, a plurality of electron emitters on the cathodes respectively, a patterned insulation coating, and one or more gate electrodes on the insulation coating. The cathodes and the insulation coating are located on the bottom plate.

Each electron-amplification set has multiple electron-amplification plates spaced at gaps, which are formed of a metal and coated with an electron-amplification material on the surfaces. The cross section of each electron-amplification plate can be V-shaped, U-shaped, semi-circular, arc-shaped, trapezoid, irregular, or the combination thereof. Accordingly, the planar field emission illumination module can focus the electrons, regulate the distribution of the electrons, and insulate the cathodes from high electric field interference of the anode effectively. Hence, the brightness, uniformity and color contrast of the planar field emission illumination module can be increased.

The cathodes are preferably of equal-width and line-shaped. More preferably, the cathodes are of equal-width and stripe-shaped, serpentine-shaped, zigzag-shaped or irregular, but not limited thereto. The cathodes can be continuous or discontinuous. The cathodes can be arranged in any form, and preferably are in parallel on the bottom plate.

The bottom substrate further has one or more switches connected to the cathodes for driving the electron emitters on the cathodes. The switches can be any typical passive or active driving switch, but a passive driving switch is preferred, and more preferably is a matrix scanning drive circuit.

In a preferred embodiment of the invention, the cathodes are equal-width and stripe-shaped cathodes, which are arranged in parallel on the bottom plate for the matrix scanning drive circuit.

The patterned insulation coating consists of a plurality of spacers located between the cathodes to separate the cathodes for electrical insulation. The insulation coating can be in any pattern, depending on the shape and arrangement of the cathodes. In a preferred embodiment of the invention, the insulation coating can be a stripe insulation coating, i.e., the pattern of the insulation coating is stripe-shaped.

The electron-amplification sets are not limited to the amount, and can depend on the process requirements of low driving voltage, high electron amplification and low manufacturing cost to adjust the number of the sets and the arrangement between the sets to thereby obtain the optimal utility and increase the lifetime.

The arrangement and number between the electron-amplification plates in a same electron-amplification set is not limited but is adjusted depending on the process requirements. In a preferred embodiment of the invention, the electron-amplification plates in the same electron-amplification set are arranged at a same height.

The arrangement between the electron-amplification plates in a same electron-amplification set is not limited, and preferably is in parallel. In addition, the arrangement between the electron-amplification sets is not limited, but parallel and interlaced arrangements are preferred, and more preferably is a parallel arrangement.

The gap distance between two neighboring electron-amplification plates is not limited but is adjusted, depending on the distance and number between the electron-amplification sets or the arrangement between the electron-amplification plates.

The gap distance between two neighboring electron-amplification plates in a same electron-amplification set is preferably the same, but is not limited to that. The gap distance between two neighboring electron-amplification plates in all electron-amplification sets is preferably the same, but is not limited to that.

When all electron-amplification plates are arranged in parallel and with a same gap distance to one another, the centers of each electron-amplification plate are projected on the bottom substrate at individual positions, not superimposed with one another. The centers of each electron-amplification plate of an electron-amplification set are preferably projected on the bottom substrate located in the respective projections of the gaps between the electron-amplification plates of the neighboring electron-amplification sets. Preferably, the centers of each electron-amplification plate of an electron-amplification set are projected on the bottom substrate at the respective projection locations of the centers of the gaps between the electron-amplification plates of the neighboring electron-amplification sets.

The locations where the centers of each electron-amplification plate of the electron-amplification set the closest to the bottom substrate are projected on the bottom substrate are not limited, with respect to the relative locations of the emitters, but preferably are in a one-to-one manner such that the center of an electron-amplification plate is projected on a corresponding electron emitter or a location between the electron emitters to thereby provide an electron moving path for achieving the uniform electron distribution.

In addition to the V-shaped, U-shaped, semi-circular, arc-shaped, trapezoid, irregular, and the combination configurations thereof, the electron-amplification plates can have a face-up concave. Namely, the cross section of an electron-amplification plate can have an upwardly opening of a V, U, semi-circle, arc, trapezoid or irregular shape, or the combination thereof. An electron-amplification plate can be in any pattern, but preferably is a line-shaped sheet metal, and more preferably is a stripe-shaped sheet metal. Accordingly, the structure of the electron-amplification plates can provide the features of simplifying the process and manufacturing cost and obtaining the uniform electron distribution.

In an embodiment of the invention, the electron-amplification plates can be a sheet metal with a V-shaped, U-shaped, semi-circle, arc-shaped, trapezoid or irregular cross section. In a preferred embodiment of the invention, the electron-amplification plates can be a sheet metal with the V-shaped cross section.

Electrons emitted by the electron emitters are accelerated, due to a voltage difference between the top substrate and the bottom substrate, to move and bombard on the fluorescent particles of the fluorescent powder coating of the top substrate to accordingly generate a light visible to human eye. Since the number and distribution uniformity of electrons is a key of lighting brightness and illumination uniformity, the invention applies an external positive voltage to each the electron-amplification set for generating the voltage difference to accelerate the electrons moving toward the electron-amplification sets. Accordingly, the electrons emitted are effectively focused on targets, and/or the number of electrons emitted is effectively doubled to thus generate secondary electrons bombarding on the fluorescent coating. Thus, the brightness and the illumination uniformity are increased. The external positive voltages applied to each of the electron-amplification set can be the same or not the same. Preferably, the external positive voltages are not the same and far away from a direction of the bottom substrate to thereby increase the potential.

The electron emitters can be formed in any pattern. Preferably, the electron emitters are equal-width and line-shaped including stripe-shaped, serpentine-shaped, zigzag-shaped and irregular, or dot-shapes including rectangular, round, oval, triangular and irregular. The electron emitters can be continuous or discontinuous line-shaped electron emitters. In addition, the shape and size of the electron emitters can be appropriately adjusted according to the manufacturing cost, the electron emitting efficiency, and the shapes of the cathodes and the gate electrodes.

In a preferred embodiment of the invention, the electron emitters are also arranged in parallel on the surfaces of the parallel stripe-shaped cathodes, and the electron-amplification plates of the electron-amplification sets are arranged in parallel over the parallel stripe-shaped cathodes.

In addition, the gate electrodes can be any gate electrodes suitable for a typical planar field emission display (FED). The gate electrodes can be integrated into a gate plate. The gate electrodes can be in any pattern, depending on the shape of the cathodes or the electron emitters.

In a preferred manner, the gate electrodes can be stripe-shaped or ring-shaped gate electrodes. The gate electrodes can be continuously or discontinuously equal-width and line-shaped gate electrodes. The line shape can be, for example, stripe, serpentine, zigzag and irregular shapes, in order to cooperate with the line- or dot-shaped electron emitters. The ring-shaped gate electrodes can have a one-to-one or one-to-multiple relation with respect to the dot-shaped electron emitters.

Further, the gate electrodes and one or more electron-amplification plates can be integrated into a single unit, i.e., the one or more electron-amplification plates are electrically connected to or directly used as the gate electrodes. Thus, the entire process is simplified, and the manufacturing cost is reduced.

The electron-amplification plates can be formed of any material with the function of electron amplification, and which is preferably a metal alloy selected from a group of silver-magnesium alloy, copper-beryllium alloy, copper-barium alloy, gold-barium alloy, gold-calcium alloy, tungsten-barium-gold alloy, ferro-nickel alloy, and combinations thereof; or a metal oxide selected from a group of oxides of beryllium, oxides of magnesium, oxides of calcium, oxides of strontium, oxides of barium and combinations thereof, to thereby increase the number of electrons bombarding on the fluorescent powder coating and to enhance the entire brightness and color contrast of pixels.

The electron emitters can be formed of any typical material capable of emitting electrons, and preferably are a carbon-based material selected from the group of black lead, diamond, diamond-like carbon, carbon nanotube (CNT), carbon 60 and the combination thereof. In a preferred embodiment of the invention, the planar field emission illumination module uses a CNT material to form the electron emitters for emitting electrons.

The lighting colors of the planar field emission illumination module are not limited, depending on different materials on the fluorescent powder coating to illuminate the desired light colors. The fluorescent powder coating can be a plurality of display areas (pixels) or a unit, depending on the illuminating requirements for different colors.

In a preferred manner, the fluorescent powder coating can be a red, green or blue fluorescent powder coating; or the combination thereof. Namely, the light color emitted by the planar field emission illumination module can be a single color including red, green, blue or white; or the combinations of red, green, blue and white. The white light emitted by the planar field emission illumination module originates from the combination of red, green and blue fluorescent powder materials.

For the fluorescent powder coating, a fluorescent powder material suitable for generating a red light upon energizing of electrons can be $Y_2O_3$:Eu, a fluorescent powder material suitable for generating a green light upon energizing of electrons can be, for example, $LaPO_4$:Ce, $LaPO_4$:Tb, $Y_2SiO_5$:Tb, $Ga_2O_3 \cdot B_2O_3$:Tb or $(CeTb)MgAl_{11}O_{19}$, and a fluorescent powder material suitable for generating a green light upon energizing of electrons can be, for example, $SrO_5(PO)_3Cl$:Eu, $(SrCaBa)_5(PO_4)_3Cl$:Eu or $BaMgAl_{16}O_{27}$:Eu.

When the fluorescent powder coating is divided into the plurality of display areas, a shield layer is further provided to surround each display area for eliminating the light leakage or increasing the color contrast. The shield layer can be implemented by a typical screen printing technique.

In order to seal the planar field emission illumination module and increase the mechanism supporting effectiveness and the vacuum degree to thereby increase the lifetime and reliability of the planar field emission illumination module, exterior side walls and side lateral walls are further provided between the top substrate and the bottom substrate. The exterior side walls immediately adjacent to the interior side walls respectively can provide a sealed inner space in the planar field emission illumination module.

The walls can be formed of any typical sealing material. Preferably, the interior side walls are formed of a gas absorbent containing ferro-nickel alloy in order to increase the mechanical strength of the illumination module and absorb moisture, oxygen, carbon dioxide and other residual gases of the sealed space in the illumination module to thereby provide a good vacuum environment. The gas absorbent can be any typical ferro-nickel alloy capable of absorbing gases, and preferably is a material of $Cr_xInvar_{1-x}$, for $0.1<x<0.5$.

The planar field emission illumination module can be used in any illumination applications, and preferably in a display or a typical planar illuminator to be a light source.

The planar field emission illumination module is a high-voltage-low-current illumination module. Accordingly, the invention can have an illumination effect of high brightness without increasing the operating power, which can save the required energy and have no heat generation. In addition, the planar field emission illumination module uses the electron-amplification plates to uniformly distribute the electrons drawn out of the planar field emission devices such that the uniform light rays are provided without using the light guide sheet, the reflector sheet and the diffuser sheet. In this case, the planar field emission illumination module can have the advantages of smaller thickness (1.5 cm or below), lifetime increase on the fluorescent powder coating and good imaging definition, as compared to the conventional CCFT.

Other objects, advantages, and novel features of the invention will become more apparent from the following detailed description when taken in conjunction with the accompanying drawings.

DETAILED DESCRIPTION OF THE PREFERRED EMBODIMENT

The planar field emission illumination module of the invention essentially uses the principle of field emission display (FED) in illumination. Namely, at a vacuum environment below $10^{-6}$ torr, an external bias voltage is applied to draw electrons out of planar field emission devices of the cathodes, and the electrons are accelerated by a positive voltage at the top anode plate to bombard on a fluorescent powder coating so as to generate luminescence. In this case, the invention can allow a typical field emission display (FED) to have the brightness of over 100 foot-lamberts (ftL).

First Embodiment

Figure 1:
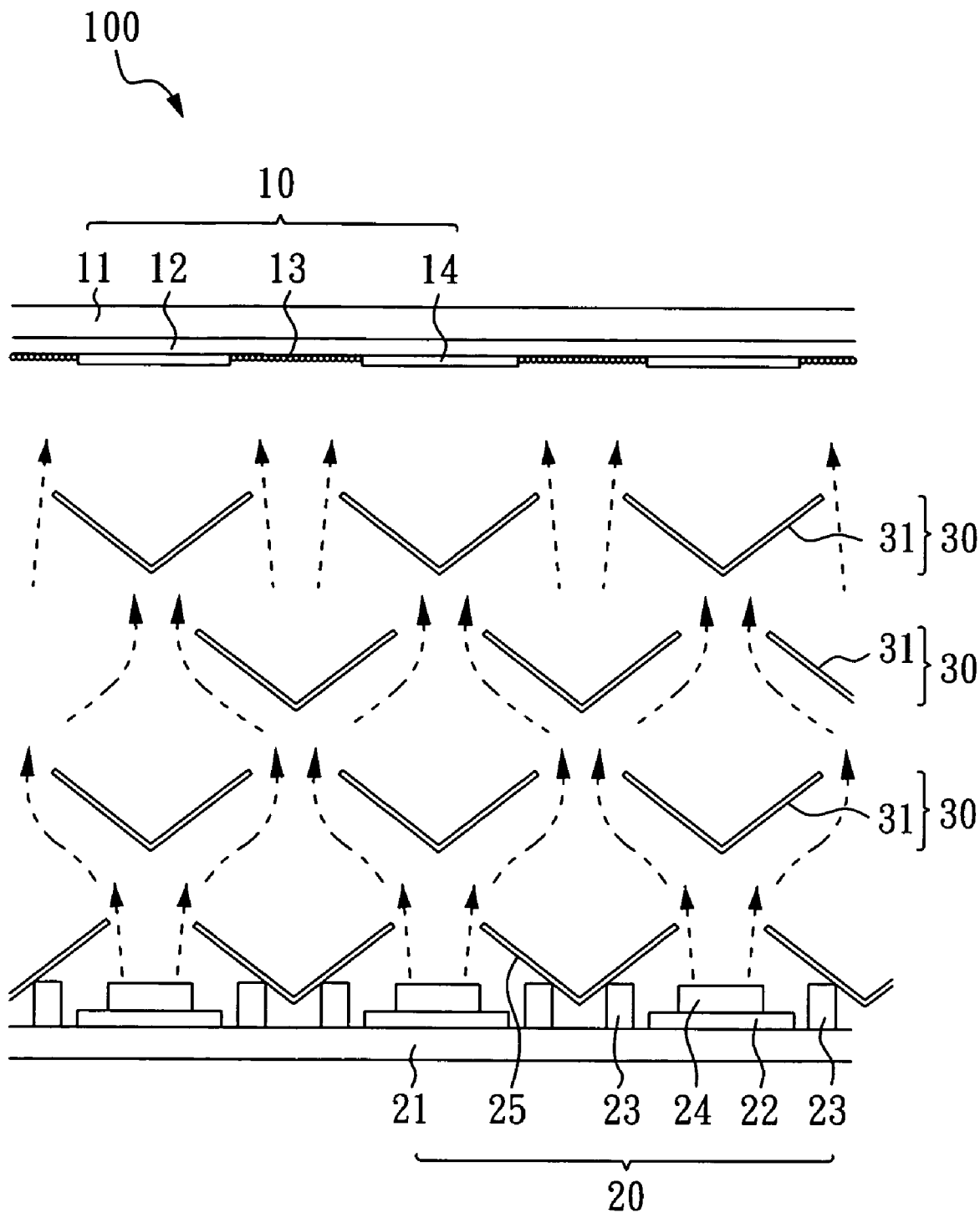
FIG. 1 is a cross-sectional view of a planar field emission illumination module according to a preferred embodiment of the invention.

FIG. 1 is a cross-sectional view of a planar field emission illumination module 100 according to a preferred embodiment of the invention. In FIG. 1, the illumination module 100 includes a top substrate 10 having a transparent plate 11, an anode 12, a fluorescent powder coating 13 and a shield layer 14; a bottom substrate 20; and three electron-amplification sets 30a, 30b, 30c located between the top substrate 10 and the bottom substrate 20. Each electron-amplification set has a plurality of electron-amplification plates 31.

The fluorescent powder coating 13 is formed by mixing red, green, blue (RGB) fluorescent powders. The transparent plate 11 is of a glass or other transparent material. The anode 12 is formed of a transparent and electrically conductive material, such as an indium-tin-oxide (ITO) or indium-zinc-oxide (IZO).

As shown in FIG. 1, the bottom substrate 20 has a bottom plate 21, a plurality of stripe-shaped cathodes 22, an insulation coating consisting of a plurality of stripe-shaped spacers 23, a plurality of stripe-shaped electron emitters 24 and a plurality of gate electrodes 25. The cathodes are formed of an electrically conductive material or metal oxide. The spacers 23 are formed of a metal oxide such as the aluminum oxide or the magnesium oxide. The electron emitters 24 are formed of a carbon nanotube (CNT) material.

The cathodes 22 are formed on the bottom plate 21. The electron emitters 24 are formed on or over the cathodes 22 in a one-to-one manner. Each gate electrode 25 is supported by two spacers 23. It is to be noted that the gate electrodes 25 can be replaced by the electron-amplification plates 31 to thereby save the processing steps. The planar field emission illumination module can be alternativelyimplemented, and is not limited to the aforementioned. For example, a plurality of electron emitters 24 can be formed on each cathode 22.

Each electron-amplification plate 31 in the electron-amplification sets 30a, 30b, 30c is formed of a line-shaped sheet metal with a V-shaped cross section, but is not limited to that. For example, the cross section can be U-shaped, semi-circular, arc-shaped, trapezoid, irregular, and the combination thereof. The gap distance between two neighboring electron-amplification plates 31 in a same electron-amplification set 30a, 30b or 30c is the same. The surfaces of each electron-amplification plate 31 are coated with a ferro-nickel or silver-magnesium alloy for electron amplification.

As shown in FIG. 1, the electrons emitted by the electron emitters 24 are directed to the device 10 as indicated by the dotted arrows. In the electron-amplification set 30a the closest to the bottom substrate 20, the centers of each electron-amplification plate 31 are projected just on the corresponding electron emitters 24. In addition, the centers of each electron-amplification plate 31 of the set 30b are projected just on the corresponding centers of the gaps between the electron-amplification plates 31 of the set 30a, and the centers of each electron-amplification plate 31 of the set 30c are projected just on the corresponding centers of the gaps between the electron-amplification plates 31 of the set 30b. Such an arrangement can distribute the electrons emitted over each electron-amplification set and further bombard on the fluorescent powder coating 13 of the top substrate 10 uniformly, thereby providing the illumination uniformity.

Figure 2:
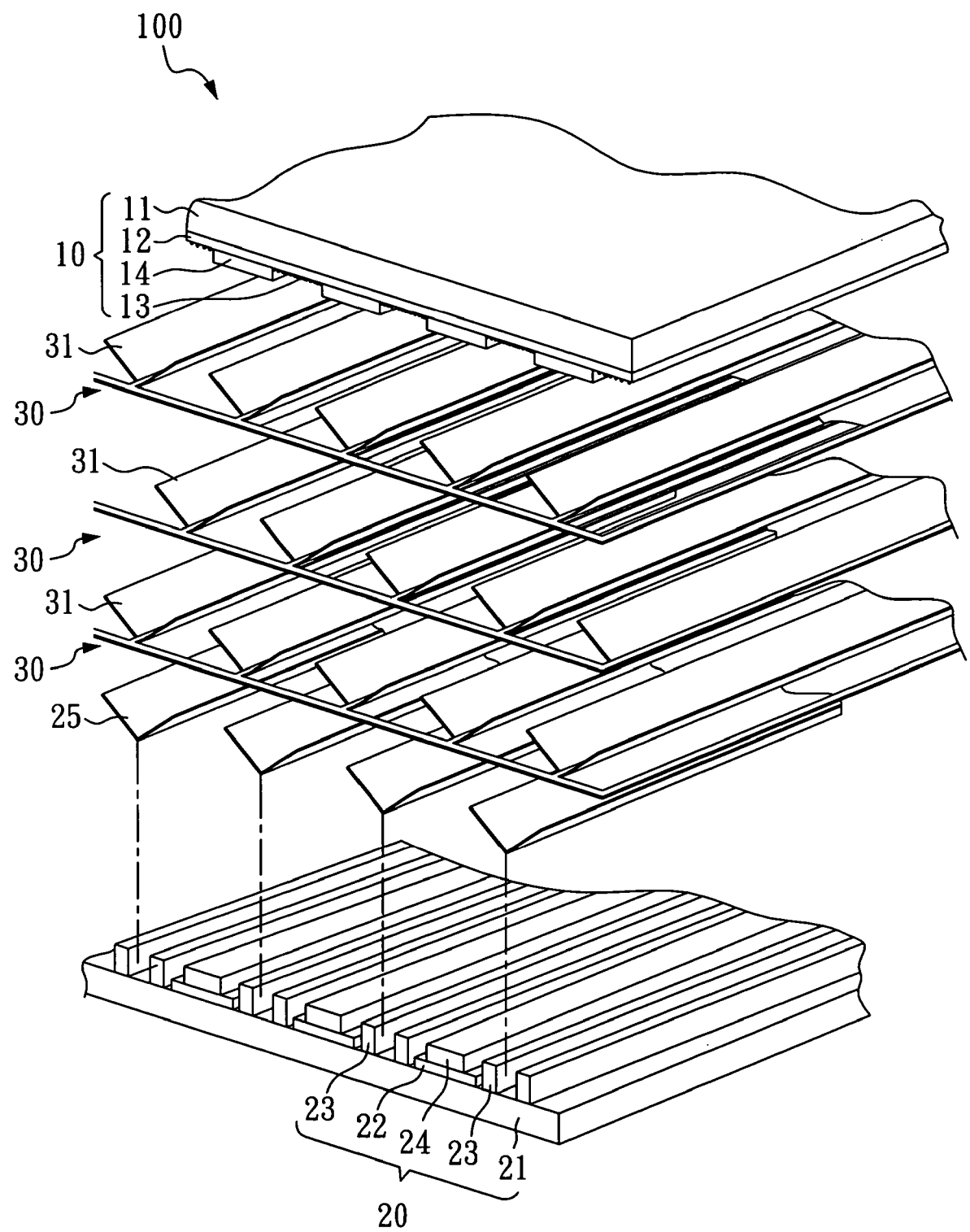
FIG. 2 is an exploded elevation view of a planar field emission illumination module according to a preferred embodiment of the invention.

FIG. 2 is an exploded elevation view of the planar field emission illumination module 100 according to a preferred embodiment of the invention. As shown in FIG. 2, the electron-amplification plates 31 between the devices 10 and 20 are parallel to one another. The stripe-shaped cathodes 22, the stripe-shaped electron emitters 24, the stripe-shaped spacers 23, and the gate electrodes 25 formed with the electron-amplification plates 31 are arranged on the bottom plate 21 in parallel to the parallel electron-amplification plates 31.

Each electron emitter 24 is controlled by controlling a voltage difference between the cathode 22 and the gate electrode 25 to accordingly emit electrons at the assigned time. In addition, the electrons emitted by the electron emitter 24 are accelerated toward the top substrate 10 due to the voltage difference. Thus, the electrons bombard on the fluorescent powder coating 13 and react with the fluorescent material to generate a visible light. Subsequently, the visible light passes through the transparent plate 11 to the outside and thus is visible to the human eye.

In this embodiment, the process for the top substrate 10 and the bottom substrate 20 can be any process for preparing typical FED top and bottom substrates. For example, a screen printing, sputtering, coating, lithography or etching technique can be used to form the planar field emission illumination module. In addition, the electron-amplification plates are formed by a typical extruding technique. The process for the invention is simple, as compared to the prior art, and the manufacturing cost is relatively reduced.

Second Embodiment

Figure 3:
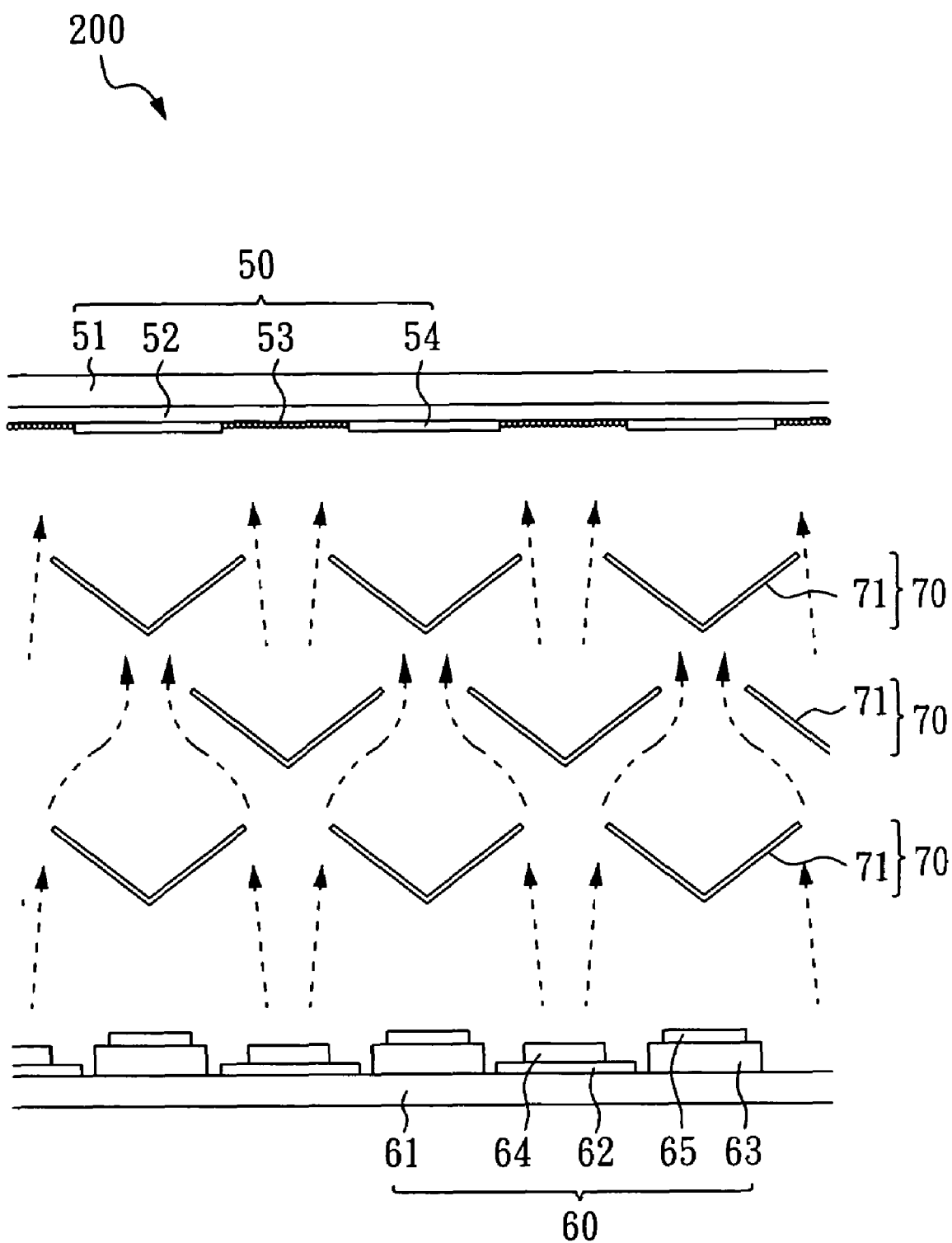
FIG. 3 is a schematic view of a planar field emission illumination module according to a preferred embodiment of the invention.

FIG. 3 is a schematic view of a planar field emission illumination module 200 according to a preferred embodiment of the invention. In FIG. 3, the illumination module 200 includes a top substrate 50 having a transparent plate 51, an anode 52, a fluorescent powder coating 53 and a shield layer 54; a bottom substrate 60; and three electron-amplification sets 70a, 70b, 70c located between the substrates 50 and 60.

In this embodiment, as compared to the first embodiment, the difference is in that the gate electrodes 65 are formed in a stripe shape and on the corresponding insulators 63 by a screen printing technique, and the centers of each electron-amplification plate 71 of the set 70a the closest to the bottom substrate 60 are projected on a location between the corresponding two electron emitters 64. The other devices are identical to those of the first embodiment and not repeated.

Figure 4:
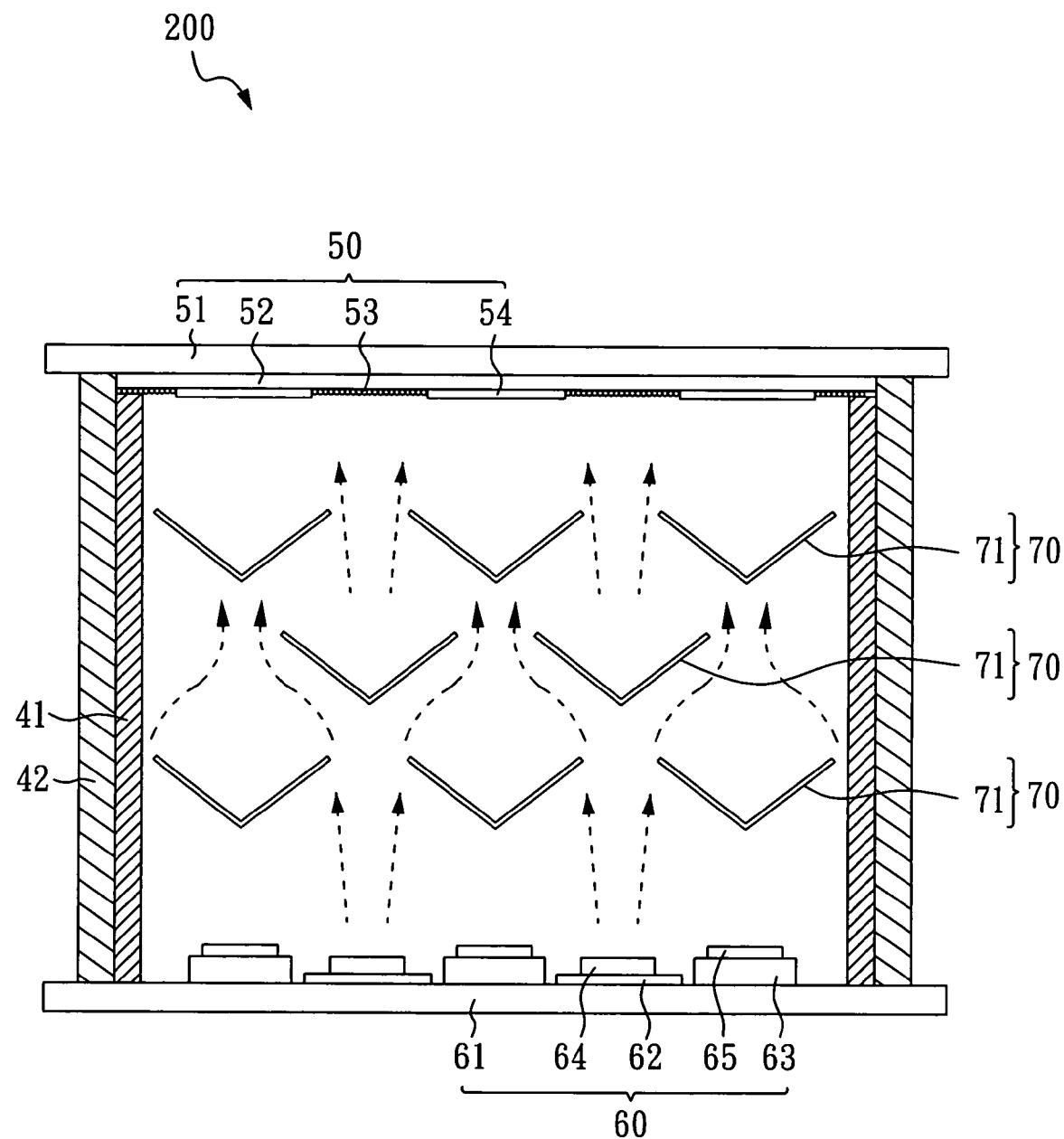
FIG. 4 is a schematic view of a package of a planar field emission illumination module according to a preferred embodiment of the invention.

FIG. 4 is a schematic view of a package of the planar field emission illumination module 200 according to the invention. As shown in FIG. 4, the planar field emission illumination module 200 further includes a plurality of interior and exterior side walls 41 and 42 between the top substrate 50 and the bottom substrate 60. The exterior side walls 42 adjacent to the interior side walls 41 can provide a sealed inner space in the planar field emission illumination module 200. In this case, the interior side walls 41 can be formed of a ferro-nickel-alloy-based material ($Cr_x Invar_{1-x}$, for $0.1<x<0.5$) to absorb moisture, oxygen, carbon dioxide and other residual gases. The exterior side walls 42 are formed of a material with a thermal expansion rate closer to that of the plates 51 and 61.

Accordingly, in addition to sealing the planar field emission illumination module 200, the sealing structure consisting of the interior and exterior side walls 41 and 42 can enhance the mechanical strength and increase the vacuum degree. Thus, the lifetime and reliability of the module 200 are increased.

Third Embodiment

Figure 5:
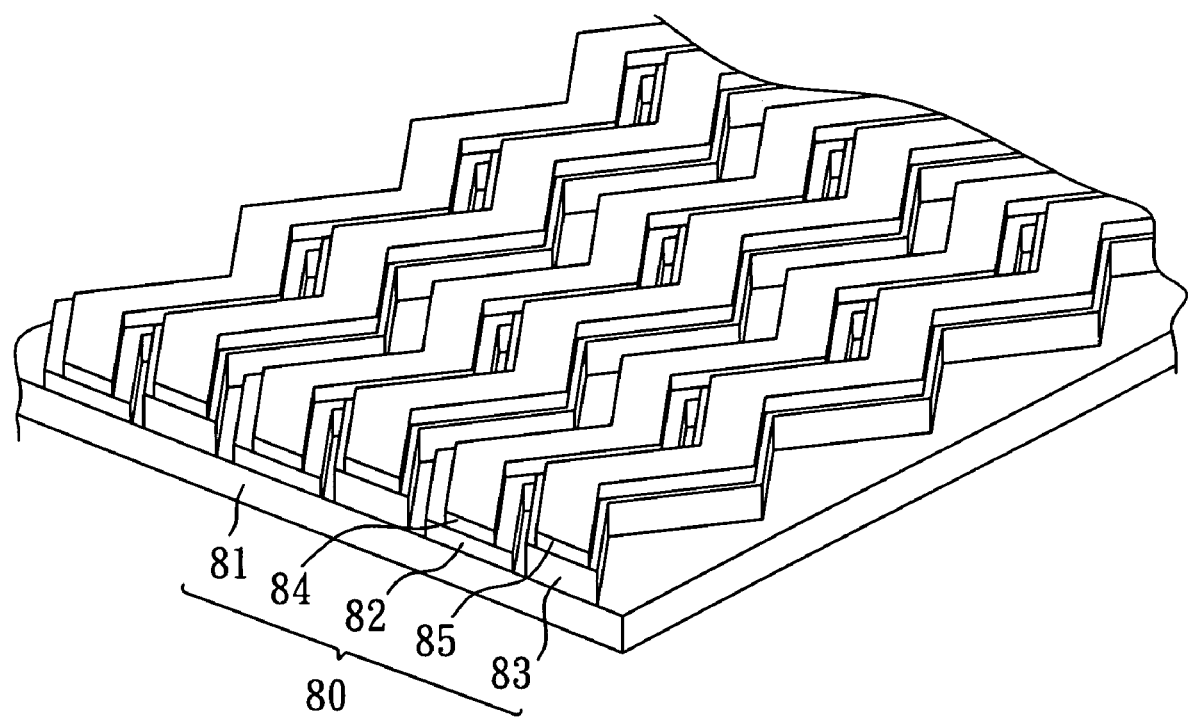
FIG. 5 is a side view of a bottom substrate according to a preferred embodiment of the invention.

FIG. 5 is a side view of a bottom substrate according to the invention. As shown in FIG. 5, the bottom substrate 80 includes cathodes 82, insulators 83, electron emitters 84 and gate electrodes 85, which have different shapes from those of the second embodiment. Namely, the cathodes 82, the insulators 83, the electron emitters 84 and the gate electrodes 85 are formed in a continuous zigzag shape and arranged on the bottom plate 81 in parallel. The arrangement and shape of the devices 82-85 can be varied. For example, the electron emitters 84 can be shaped into a dot shape such as rectangular, round, oval and triangular, or discontinuous stripes on the cathodes 82, depending on the needs.

As cited, the planar field emission illumination module has the features of high-brightness, thin structure (with a thickness of about 1.5 cm), uniform illumination, low power consumption, easy assembly, simple process and low manufacturing cost.

Although the present invention has been explained in relation to its preferred embodiment, it is to be understood that many other possible modifications and variations can be made without departing from the spirit and scope of the invention as hereinafter claimed.

What is claimed is:

1. A planar field emission illumination module, comprising:
    a top substrate, which has a fluorescent powder coating and an anode;
    a bottom substrate, which comprises a bottom plate, a plurality of cathodes, a plurality of electron emitters on the cathodes respectively, a patterned insulation coating consisting of a plurality of spacers, and one or more gate electrodes as electron-amplification plates on the insulation coating and each gate electrode is supported by two spacers; and
    a plurality of electron-amplification sets, between the top substrate and the bottom substrate, and each electron-amplification set has the multiple electron-amplification plates;
    wherein the electron-amplification plates in the electron-amplification sets are spaced at gaps, and formed of a sheet metal on which surface an electron-amplification material is coated, and have a pattern of cross section selected from a group consisting of V shape, U shape, semi-circle shape, arc shape, trapezoid shape, irregular shape, and the combinations thereof.

2. The illumination module as claimed in claim 1, wherein the insulation coating consists of a plurality of spacers separated from the cathodes.

3. The illumination module as claimed in claim 1, wherein the cathodes have an equal width.

4. The illumination module as claimed in claim 3, wherein the cathodes with the equal width are formed in a pattern selected from a group consisting of stripe shape, serpentine shape, zigzag shape, irregular shape, and the combinations thereof.

5. The illumination module as claimed in claim 4, wherein the cathodes have the equal width and the stripe shape, and are arranged in parallel on the bottom plate.

6. The illumination module as claimed in claim 5, wherein the spacers are patterned with the stripe shape.

7. The illumination module as claimed in claim 1, wherein the electron-amplification plates in each electron-amplification set have an equal height.

8. The illumination module as claimed in claim 1, wherein the electron-amplification plates in each electron-amplification set are arranged in parallel.

9. The illumination module as claimed in claim 1, wherein the electron-amplification plates are face-up concave.

10. The illumination module as claimed in claim 1, wherein the sheet metal used to form the electron-amplification plates is stripe-shaped.

11. The illumination module as claimed in claim 1, wherein the gaps in a same electron-amplification set are equal.

12. The illumination module as claimed in claim 1, wherein the gaps in all electron-amplification sets are equal.

13. The illumination module as claimed in claim 12, wherein the electron-amplification plates in two neighboring electron-amplification sets have a center each, and the centers are projected on the bottom substrate at separate locations without superimposition.

14. The illumination module as claimed in claim 1, wherein the cathodes are integrated into a single unit.

15. The illumination module as claimed in claim 1, wherein the cathodes are integrated with one or more electron-amplification plates into a single unit.

16. The illumination module as claimed in claim 1, wherein the cathodes are in stripes.

17. The illumination module as claimed in claim 1, wherein the electron-amplification material is an alloy selected from a group consisting of silver-magnesium alloy, copper-beryllium alloy, copper-barium alloy, gold-barium alloy, gold-calcium alloy, tungsten-barium-gold alloy, and a combination thereof.

18. The illumination module as claimed in claim 1, wherein the electron-amplification material is an oxide selected from oxides of beryllium, oxides of magnesium, oxides of calcium, oxides of strontium, oxides of barium, and the combinations thereof.

19. The illumination module as claimed in claim 1, further comprises a plurality of exterior and interior side walls between the top substrate and the bottom substrate, wherein the exterior side walls immediately adjacent to the interior side walls respectively provide a sealed inner space in the planar field emission illumination module.

20. The illumination module as claimed in claim 19, wherein the interior side walls are formed of a gas absorbent containing ferro-nickel alloy.

21. The illumination module as claimed in claim 1, in the electron-amplification set the closest to the bottom substrate, the centers of each electron-amplification plate are projected on the corresponding electron emitters and the centers of each electron-amplification plate of the set above the set closest to the bottom substrate are projected on the corresponding centers of the gaps between the electron-amplification plates of the set above the set closest to the bottom substrate and the centers of each electron-amplification plate of the set closest to the top substrate are projected on the corresponding centers of the gaps between the electron-amplification plates of the set above the set closest to the bottom substrate.

22. The illumination module as claimed in claim 1, wherein the cathodes, insulation coating, electron emitters and gate electrodes are formed in a continuous zigzag shape and arranged on the bottom plate in parallel.

* * * * *

UNITED STATES PATENT AND TRADEMARK OFFICE
CERTIFICATE OF CORRECTION

PATENT NO. : 7,629,731 B2  Page 1 of 1
APPLICATION NO. : 11/482723
DATED : December 8, 2009
INVENTOR(S) : Tsai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 732 days.

Signed and Sealed this

Twenty-first Day of December, 2010

David J. Kappos
*Director of the United States Patent and Trademark Office*